S. B. MANNING.
Smut Mill.
No. 19,860.
Patented April 6, 1858.
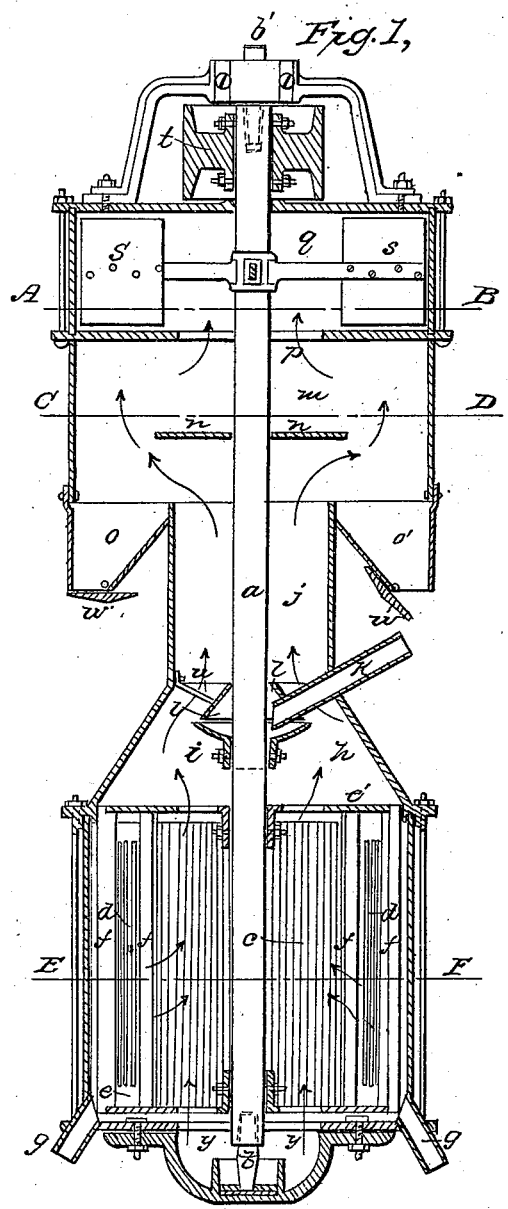
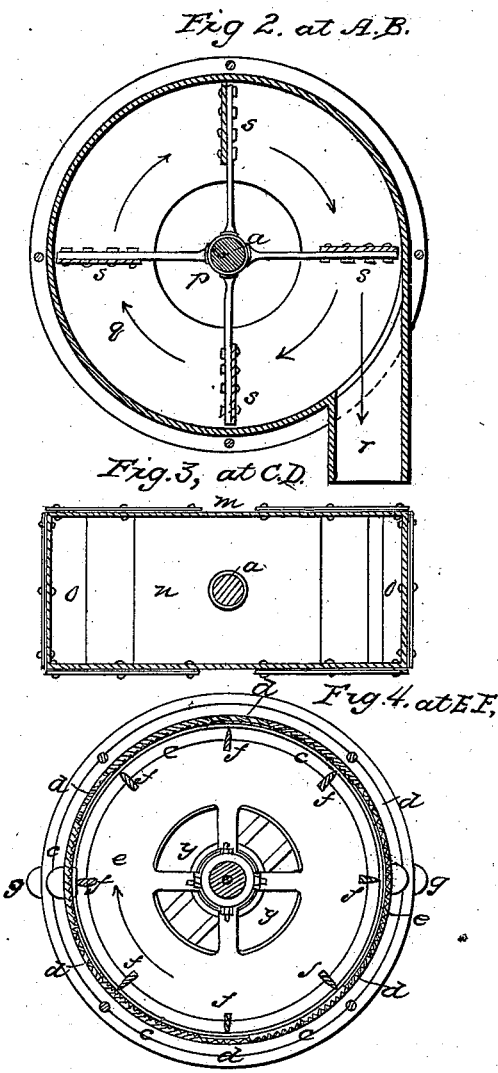

UNITED STATES PATENT OFFICE.

SAML. B. MANNING, OF ALLEGHENY CITY, PENNSYLVANIA.

SMUT-MACHINE.

Specification of Letters Patent No. 19,860, dated April 6, 1858.

*To all whom it may concern:*

Be it known that I, SAMUEL B. MANNING, of Allegheny City, in the county of Allegheny, State of Pennsylvania, have invented a new and useful Smut-Machine and Separator Combined; and I do hereby declare the following to be a full, clear, and exact description thereof, reference being had to the annexed drawing, forming part of this specification, in which—

Figure 1, is a longitudinal vertical section of my machine through the center or axis. Fig. 2 is a transverse section, at right angles to the axis at A, B, Fig. 1, through the fan box. Fig. 3, is a transverse section through C, D, of Fig. 1. Fig. 4, is a transverse section through E, F, of Fig. 1, through the concave of the smut machine.

In the several drawings like letters of reference denote similar parts.

In order to enable others skilled in the art to make and use my improved machine I will proceed to describe its construction and operation.

In the several drawings $a$ is the axis or shaft, which is placed vertically in the center of the machine. This shaft turns on two stationary pins $b$, $b'$, which are let into sockets, one at each end of the shaft. The smut machine or concave $c$ is placed at the lower extremity of the apparatus. It consists of an upright cylindrical box, the sides of which are smooth externally, but corrugated on the inner surface, excepting that there are inserted in the spaces left in the sides of the concave, slats $d$, $d$, &c., set obliquely, so as to leave openings for the admission of air into the smut machine. The spaces in the periphery of the concave for the insertion of the slats, occur at regular intervals as seen at Fig. 4. There is a circular opening in the bottom of the smut machine, for the admission of air; and the top where it connects with the separator is entirely open. Two circular disks $e$, $e'$, are attached to the shaft $a$ so as to revolve with it, in a horizontal plane: one $e$ near the bottom of the concave $c$, and the other $e'$ on a level with its upper edge. These disks have openings near the center for the passage of air and the grain. To the edge of these disks $e$, $e'$, are attached several beaters $f$, $f$, &c., at uniform distances apart, and passing perpendicularly from one disk to the other, thus connecting them together. At the base of the concave $c$, are placed two pipes $g$, $g$, to carry off the cleansed grain. From the top of the concave, where the smut machine is attached to the separator the diameter of the separator rapidly contracts, so as to assume the shape of an inverted funnel, as seen at $h$, Fig. 1, for the purpose of increasing the strength of the draft of air passing upward through the machine.

In the funnel $h$, attached to the shaft $a$, and revolving with it is a cup $i$, into which the grain to be cleaned is poured, gradually, through a spout $k$ passing through the side of the funnel. Over this cup is placed a cone $l$, through the center of which the shaft $a$ passes, and which is stationary, and held in place by being attached on one side to the spout $k$, and on the other, by a brace $x$ to the side of the separator. This cone may be made longer or shorter than shown in the drawing, as may be found desirable, so as to prevent an eddy in the blast of air which would otherwise exist immediately above the distributing cup $i$. From the top of the funnel the neck $j$ of the separator is of uniform diameter, (see Fig. 1,) about half that of the concave $c$, until it unites with the separating chest $m$; which is a rectangular box (see Fig. 2) with a circular aperture above, where it opens into the fan box $q$ and below where it connects with the neck $j$ of the separator. Across this separating chest $m$ is placed a shelf $n$, over the opening into the neck $j$ of the separator, and sufficiently high to allow a free passage for the draft. This shelf $n$ extends fully across the separating chest, sidewise but not lengthwise, leaving a passage upward for the draft at either end of the separating chest, over the hoppers $o$, $o'$, where the screenings are deposited. At the bottom of each of these hoppers $o$, $o'$, is a selfacting trap or valve $w$, $w$, which opens when the hopper is full, by the weight of the screenings, and shuts as soon as the contents of the hopper are discharged. Immediately above the separating chest $m$, and connecting with it by the aperture $p$, is the fan box. This is a circular box closed at top, with a spout or vent $r$, (see Fig. 2) for the exit of the draft created by the fans, and of the chaff, dust, &c., carried by it. In this fan box $q$, revolves the fan $s$, which is attached to the shaft $a$. The shaft $a$ passes up through the top of the fan box $q$ and is caused to revolve by power communicated to the drum $t$.

Having thus described the several parts of my apparatus, I will proceed to explain its operation. The shaft $a$ is caused to rotate rapidly on its axis, in the direction indicated by the arrows in Fig. 2, creating a strong suction draft, which is drawn upward through the whole length of the apparatus; entering at the aperture $y$ in the bottom and between the slats $d\ d$ in the sides of the concave $c$, (see Fig 1) and following the course of the arrows in Fig. 1, until it finds its exit at the spout or vent $r$. Care must be taken that the aperture $y$ is not so large as to admit so much air as to impair the strength of the blast inward through the slats of the concave. This aperture $y$ may be reduced in size or closed entirely, if necessary, by a movable covering. The grain to be cleaned is admitted into the machine, through the pipe or conductor $k$, whence it falls in a continuous stream into the cup $i$. This cup $i$ rotates rapidly with the shaft $a$, and causes the grain to fly off in all directions, by the centrifugal force thus created, in a constant shower, in the funnel $h$, whence it falls into the smut machine, or concave $c$, below. As there is a strong current of air passing upward through the funnel, $h$, which here meets the grain, at the point where the draft is strongest, owing to the contraction of the diameter of the machine at that point, all the chaff and loose dirt from the grain, together with any imperfect grain, (which is of less specific gravity than that which is sound), is caught and carried upward by the draft, while the sound grain, being too heavy to be carried upward by the draft, falls into the concave $c$. Thus the use of a revolving cup to distribute the grain as it falls into the smut mill insures the action of the beaters on all of the grain. The cone $l$, placed over the revolving cup $i$, catches any of the sound grain which might otherwise be thrown upward into the narrow neck $j$, between the funnel $h$ and the separating chest $m$, and returns it into the cup $i$, and also prevents an eddy above the cup which would be caused by the obstruction of the draft of air by the cup $i$; which eddy would allow the screenings and dirt which are carried upward by the blast, to fall into the cup or back into the concave. When the grain falls into the concave $c$, it is struck by the beaters $f\ f$ and the dirt or smut adhering to it is knocked off the draft through the concave preventing the grain falling too rapidly to be well cleaned, and carrying upward the smut thus detached from the kernels. The cleaning of the grain is aided by the corrugated sides of the concave $c$, which cause the grain to fly back against the beaters repeatedly, in its descent through the concave; and the slats $d\ d$ are placed in the openings in the circumference of the concave at such an angle as to prevent the exit of the grain in that direction, and throw it back against the beaters while the current of air passing inward through the slats at several points in the circumference of the concave, carries the grain, which the beaters have thrown against the slats and concave, inward toward the beaters again, and prevents it remaining, while in the concave, at its circumference and outside of the range of the beaters.

One practical difficulty in smut mills where a current of air is employed, is that the blast being admitted into the concave from below, and not, as in my machine, from the sides of the concave, the air passes up in the center while the force of the blast is comparatively slight at the sides, and thus the grain being thrown by the beaters outward toward the circumference of the concave is not subjected to the full influence of the blast of air. When the grain has been thoroughly cleaned in the smut mill, it passes out at the pipes $g, g$. The light and imperfect grain, with the chaff straw and dust which do not fall into the smut mill, and the smut, which passes upward from the concave, are carried by the draft through the funnel and neck into the separating chest $m$. Here they are met in their course by the shelf $n$, which contracts still further the passage for the air, thus preventing an eddy which might cause the screenings to fall back through the neck $j$ of the separator, among the good grain; or the dust and smut to lodge in the hoppers $o, o'$, designed to catch the screenings. So soon, however, as the draft reaches the edge of the shelf $n$ in the separating chest $m$, the space is enlarged and the screenings fall, by their own weight, into the hoppers $o, o'$, at either end of the separating chest, while the smut, dust and chaff are still borne upward by the draft, into the fan box; and the shelf $n$ being immediately under the opening between the separating chest $m$ and the fan box $q$, prevents any impurities falling back into the neck $j$ of the separator. The dust, chaff, etc., are thence expelled through the spout or vent $r$.

What I claim as my invention and desire to secure by Letters Patent is:—

The use of a cone $l$ placed above the distributing cup, to prevent any eddy or interruption of the draft of air which would cause the deposit of the screenings and dirt in the cup.

In testimony whereof I have hereunto set my hand this thirteenth day of January Anno Domini 1857.

SAML. B. MANNING.

Witnesses:
W. BAKEWELL,
AND. McMASTER.